INVENTOR.
HERMAN R. GELBACH
BY Warren T. Jessup
ATTORNEY

United States Patent Office 3,353,409
Patented Nov. 21, 1967

3,353,409
PRESSURE RESPONSIVE TRANSDUCER
Herman R. Gelbach, Pullman, Wash., assignor to
J. C. Pemberton, San Diego, Calif.
Filed Sept. 20, 1965, Ser. No. 488,676
3 Claims. (Cl. 73—398)

ABSTRACT OF THE DISCLOSURE

An instrument for measuring fluid pressure is described in the specification. The instrument provides a pressure sensitive transducer in the form of a composite piston assembly which includes an annular force ring interposed between a pair of pistons. One of the pistons is movable in a cylindrical housing, and the other piston is fixed to the base of the housing. Both pistons are sealed to the inner wall of the housing by O-rings so as to provide a sealed chamber within the assembly. A fluid of reference pressure is introduced into the sealed chamber.

---

This invention relates to apparatus for measuring fluid pressure, being particularly adapted for measuring high-transient fluid pressures.

Strain gauge pressure transducers might be considered to be resistive transducers, but are usually classified separately. They convert fluid pressure into an electrical signal. It is generally thought that this is true by the fact that when a wire is stretched, its diameter is decreased and its electrical resistance is increased, but there are other theories. The change in resistance is a measure of the displacement. The strain gauge is usually used in a Wheatstone bridge circuit.

The purpose of this invention is to provide a fluid pressure responsive device which has an interior chamber subject to controlled pressure in order to provide an accurate reference pressure against which the measured pressure reacts.

A further object of the invention is to provide a pressure-sensitive transducer in the form of a composite piston assembly, wherein an annular force ring serves as a spring to hold two opposed piston portions apart, thereby magnifying the mechanical movement of one piston part relative to the other, in the extreme portions of the spring return bend configuration.

It is another object of this invention to provide a composite assembly wherein the end of the composite assembly, which serves as a piston exposed to the pressure being measured, is required to move so little that an O-ring seal may be employed effectively by confining the piston movement within the range of the resiliency of the O-ring, thereby requiring no sliding of the O-ring.

It is a general object of the invention to provide an improved apparatus for measuring fluid pressure forces with a high degree of accuracy, sensitivity, and dependability, combined with simplicity, ruggedness, and economy of construction, operation and maintenance.

Figure 1:
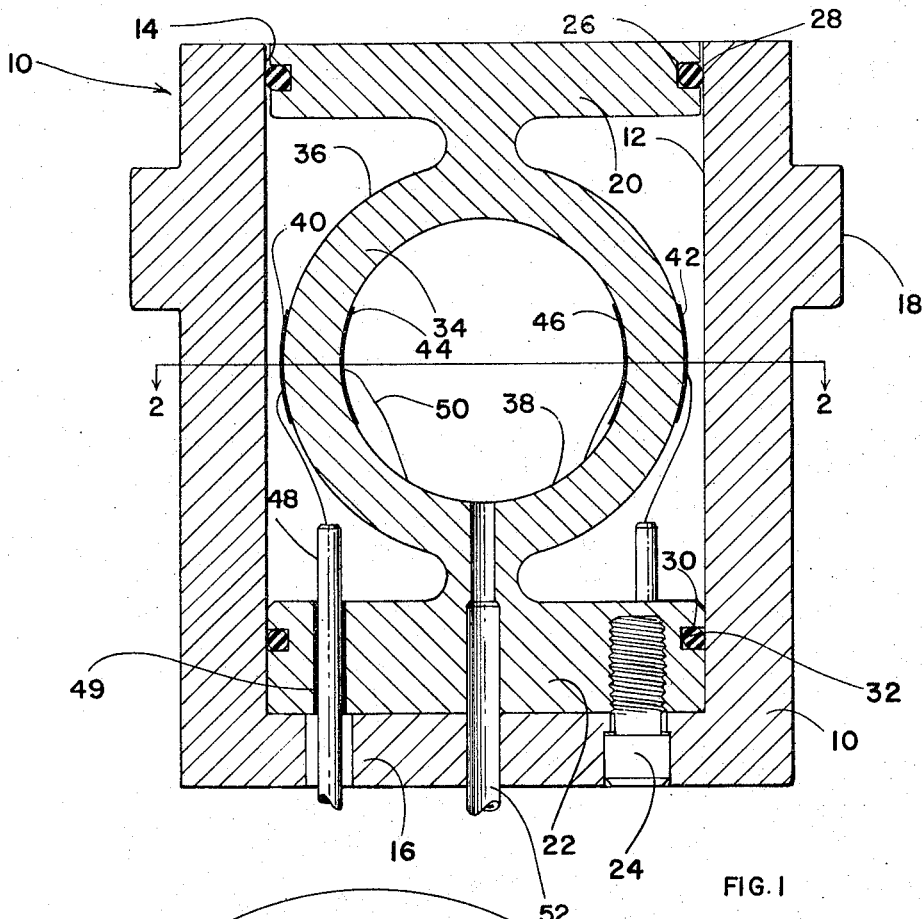
Figure 2:
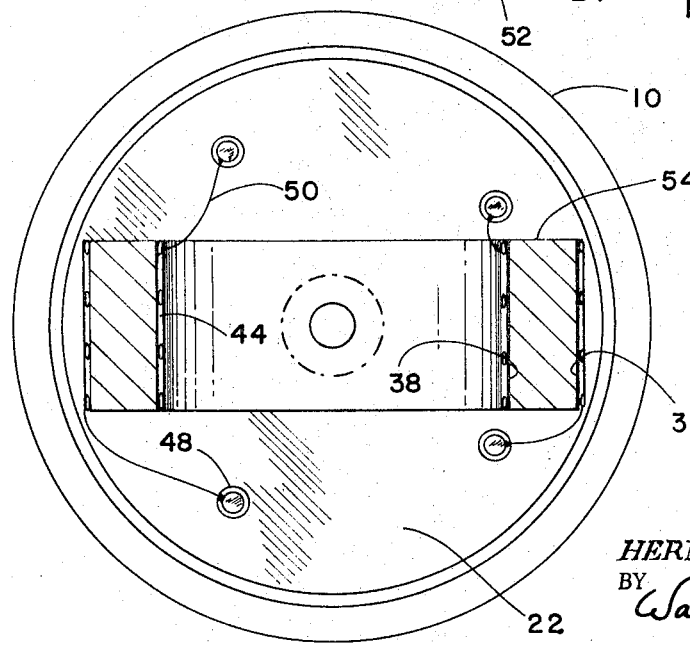

In accordance with these and other objects which will become apparent hereinafter, the best mode contemplated for the present invention is disclosed in the accompanying drawing wherein:

FIGURE 1 is a vertical section through a device incorporating the features of this invention; and FIGURE 2 is a section taken along line 2—2 of FIGURE 1.

Referring to the drawing as an illustration of the preferred embodiment of the invention, a housing 10 having a cylindrical bore 12 provides an open end 14 and a closed end 16. An annular shoulder 18 provides a mechanical abutment for acceptance of a retainer ring. The retainer ring (not shown in the drawing) will apply an end force to hold the housing 10 to a source of pressure to be measured.

A dynamometer assembly for operation within the bore 12 is composed of a front piston 20 and a rear piston 22. The rear piston 22 is held against movement in the bore 12 by means of a screw 24 extended through the closed end 16 and threaded into the piston 22.

The front piston 20 is loosely fitted in the bore 12 in order to avoid actual contact with the walls of bore 12, and thus eliminate any frictional drag. The rear piston 22 is preferably placed in the bore 12 under a slight press fit for accurate location of the assembly within the bore 12.

Devices of this nature in the prior art have employed diaphragms in order to prevent blow-by past the front piston. In such sealing of the piston by means of a catenary bridge, the pressure which may be applied to the front piston 20 is unidirectional. The pressure must be greater from the external side of the piston than from the interior between the pistons.

Rubber O-rings are well known to have a high hysteresis loss, and hence, it is contrary to logical engineering concepts to use O-rings in any device which must be absolutely free of drag. It has now been discovered, however, according to the teaching of this invention, that a rubber O-ring may, in fact, be used under proper conditions. For this purpose, it is necessary to provide a dynamometer assembly proportioned with sufficient strength to limit the front piston to a micro-inch range of axial movement. Then the piston may be sealed with an O-ring and the O-ring will be held to such a minute degree of movement that it acts in some manner which does not present an hysteresis drag. The exact reason for no such drag is not understood, and is, therefore, subject to speculation theory.

It is a discovery of this invention, making possible the unique reference pressure feature of this invention, that a rubber O-ring may be employed rather than a unidirectional catenary seal.

An annular groove 26 around the front piston 20 is provided to house an O-ring 28. A similar annular groove 30 around the periphery of the rear piston 22 is provided to house a similar O-ring 32 and seal the joint between the tight fitting rear piston 22 and the bore 12.

In order to provide mobility and accurate location of the front piston 20, a strain gauge force device is used to join the two pistons. Preferably this device is a unitary structure, and in the illustrated embodiment is shown in the form of a force ring 34 having a cylindrical outer wall 36 and inner wall 38. Further, in this embodiment, strain gauges 40 and 42 are placed on the exterior surface 36, and similar strain gauges 44 and 46 are placed on the interior surface 38. The illustrated locations are useful, although other locations will suffice.

The principles of manufacturing and using strain gauges are sufficiently known in the industry that they need not be separately set forth and taught here. Generally, such gauges are comprised of a continuous solid filament of electrical conducting material bonded throughout its effective length to the cylindrical surfaces of the force ring, and the electrical resistance of the material varies with its strain.

Four connecting pin terminals 48 are extended through the piston 22 for conducting electrical signals to the exterior instrumentation used with the Wheatstone bridge circuit of the gauge. The terminals 48 are shown with a sheath of insulation 49 to prevent surface contact with the metal of the rear piston 22. In practice, aluminum is employed for the material of the dynamometer assembly and then given a high electrical resistance anodized surface. Hence, the terminals 48 are effectively insulated from the dynamometer assembly. They may be secured in place by the use of epoxy resin or similar bonding material. The strain gauges are connected by suitable leads 50 and are soldered to the terminals 48 for electrical transmission.

Finally, in order to employ the sealed chamber made possible by the use of the O-rings 28 and 32, a reference pressure tube 52 is extended through the end 16 and the piston 22 to the interior space between the two pistons. This reference pressure tube 52 may provide any desired positive or negative reference pressure between the pistons. This is an accomplishment of this invention over the prior art, and has made this invention fulfill needs heretofore unsatisfied.

While the instant invention has been shown and described herein in what is conceived to be the best mode contemplated, it is recognized that departures may be made therefrom within the scope of the invention which is, therefore, not to be limited to the details disclosed herein, but is to be afforded the full scope of the invention as hereinafter claimed.

What is claimed is:

1. A pressure responsive apparatus, comprising in combination:
   a member having a cylindrical bore subject to fluid pressure at one end;
   a dynamometer assembly disposed in said bore and having a front piston and a rear piston, said rear piston of said assembly being held against movement in said bore, said front piston of the assembly having a clearance fit in said bore for axial movement in response to a fluid pressure force applied thereto from the end of the bore subject to pressure, an annular groove around each said piston, an O-ring seal in each said groove to provide a sealed chamber in said member between said front piston and said rear piston;
   a strain gauge force device bridging between said pistons, said force device subject to strain in response to said axial movement, and a plurality of separate strain gauge filaments located on the surface of said force device, each filament comprised of a continuous solid filament of electrical conducting material bonded throughout its effective length to said force device and whose electrical resistance varies with its strain; and
   tubular means extending into the aforesaid sealed chamber to introduce a fluid of a reference pressure into said chamber between said pistons,
   whereby the resistance of said filaments is responsive to strain in said assembly arising from the differential of the reference pressure of said fluid in said chamber and said fluid pressure force applied to said front piston.

2. A pressure responsive apparatus, comprising in combination:
   a member having a cylindrical bore subject to fluid pressure at one end;
   a dynamometer assembly disposed in said bore and having a front piston and a rear piston, said rear piston of said assembly being held against movement in said bore, said front piston of the assembly having a clearance fit in said bore for axial movement in response to a fluid pressure force applied thereto from the end of the bore subject to pressure, an annular groove around each said piston, and O-ring seal in each said groove to provide a sealed chamber in said member between said front piston and said rear piston;
   a strain gauge force ring bridging between said pistons and having an outside and inside cylindrical annular surface, said force ring subject to strain in response to said axial movement, and four separate strain gauge filaments located on the ring surfaces, each filament comprised of a continuous solid filament of electrical conducting material bonded throughout its effective length to said cylindrical surfaces of the force ring and whose electrical resistance varies with its strain; and
   tubular means extending into the aforesaid sealed chamber to introduce a fluid of a reference pressure into said sealed chamber between said pistons,
   whereby the resistance of said filaments is responsive to strain in said assembly arising from the differential of the reference pressure of said fluid in said sealed chamber and said fluid pressure force applied to the said front piston.

3. An electrical pressure responsive transducer, comprising:
   a housing cylinder;
   a composite assembly having a base closely fitted in fixed relationship within said cylinder, a movable piston fitted in the end of said cylinder free of contact with the cylinder wall and exposed to access at one end of said cylinder, and an annular force ring affixed to said piston and to said base and separating said piston from said base, said force ring having an access extending transversely of the cylinder access;
   an annular groove around said base, an O-ring in said groove;
   an annular groove around said piston, an O-ring seal in said groove;
   said piston, base and O-ring seals forming a sealed chamber within said cylinder between said base and said piston;
   a pressure supply conduit extending from the exterior of said housing cylinder to the sealed chamber between said base and said piston to introduce a fluid of reference pressure into said sealed chamber;
   two opposed strain gauges carried by the exterior wall of said force ring and two opposed strain gauges carried by the interior wall thereof; and
   electrical terminal means connecting said strain gauges to the exterior of said housing cylinder.

References Cited

UNITED STATES PATENTS

| 2,414,161 | 1/1947 | Moore | 73—141 |
| 3,024,649 | 3/1962 | Taber | 73—398 X |
| 3,064,472 | 11/1962 | Taber | 73—141 |
| 3,280,628 | 10/1966 | Schloss | 73—419 X |

LOUIS R. PRINCE, *Primary Examiner.*

D. O. WOODIEL, *Assistant Examiner.*